July 12, 1938.   A. J. COBHAM   2,123,648
APPARATUS FOR REFUELING AIRCRAFT IN THE AIR
Filed Aug. 17, 1937

Patented July 12, 1938

2,123,648

UNITED STATES PATENT OFFICE 2,123,648

APPARATUS FOR REFUELING AIRCRAFT IN THE AIR

Alan John Cobham, Yapton, England, assignor to Flight Refuelling Limited, London, England Application August 17, 1937, Serial No. 159,597
In Great Britain August 21, 1936

2 Claims. (Cl. 244—135)

In my United States patent No. 2,023,310 is described a method of establishing contact for refueling purposes between two aircraft flying in the air, which consists in trailing beneath one of the aircraft a cord or the like weighted by means of a bag containing liquid. The procedure is for the pilot or an attendant in the other aircraft to grasp the bag and thus establish a connection by means of the cord between the two aircraft. Then, when the aircraft have manoeuvred into suitable relative positions, a pipe line for transferring fuel can be drawn over from one to the other by a pull on the cord.

In the earlier patent referred to, it is explained that the purpose of weighting the cord with a liquid-containing bag instead of with a solid weight is to prevent damage to the aircraft which is to pick up the bag, such as might otherwise occur if the weight were to foul the propeller, rudder, ailerons or other vulnerable portion of the machine. The liquid-containing bag will, however, be sufficiently fragile to break and discharge its contents without damaging any vulnerable part of the aircraft with which it may accidentally come into contact.

I have now found, as a result of further experiment, that good results may be obtained by using, instead of a liquid-containing bag, a balloon containing a small quantity of a granular solid sufficient to weight it, the remaining portion of the balloon being filled with air or other gas under a suitable pressure. If desired, the remaining portion of the balloon may be filled, partially or wholly, with light elastic material, such as feathers, soot, sawdust or cotton wool, instead of with air or other gas. Preferably the balloon is made of ordinary thin elastic rubber, but it may be made of other materials, e. g. thin silk, fabric, or even thin glass, celluloid, bladder or paper, or any suitable combination of these or similar materials.

As examples of suitable granular solids, sand, seeds and fine shot may be quoted. I find that if the balloon touches a vulnerable part of the aircraft it breaks very easily and at once discharges the relatively small quantity of granular material with which it is weighted without inflicting any damage.

Two methods of carrying the invention into practice are illustrative, by way of example, in the accompanying diagrammatic drawing. The first method is illustrated in Figs. 1 to 4, of which:—

Figure 1:
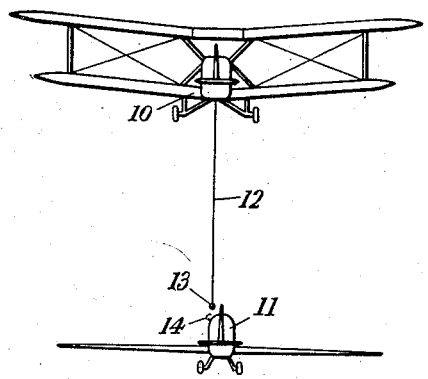
Fig. 1 is a rear view of the two aircraft showing their positions at the moment of grasping the balloon, 10 representing the supply aircraft, 11 the receiving aircraft, and 12 the cord which is suspended beneath the supply aircraft and weighted by the gas-filled balloon 13, which is weighted with a small quantity of a granular solid.
Figure 2:
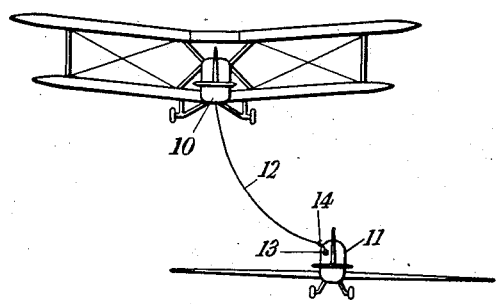
Fig. 2 is a rear view indicating the position which is preferably taken up by the receiving aircraft as soon as the balloon 13 has been grasped by the pilot or other member of the crew of the lower aircraft.
Figure 3:
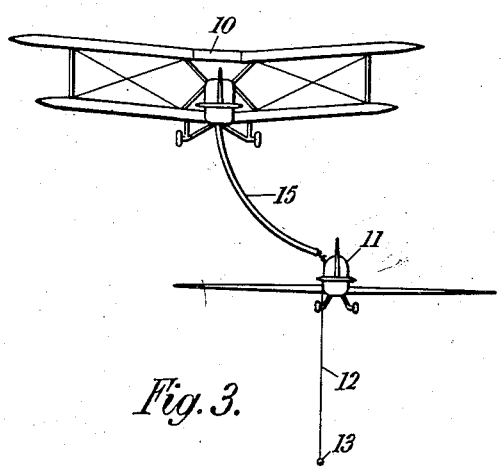

Fig. 3 is a rear view of the two aircraft after the fuel pipe 15 has been almost pulled in by the operator in the receiving aircraft, the cord 12 and balloon 13 having been passed down to trail in a position below the receiving aircraft, the cord passing through the guide 14 carried on the side of the receiving aircraft 11.

Figure 4:
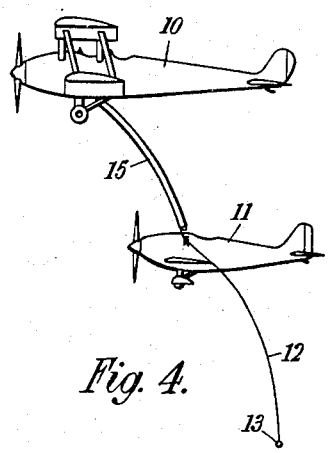

Fig. 4 is a side view of the aircraft shown in Fig. 3, indicating the relative position of the two machines in a vertical plane in the line of flight.

Figure 5:
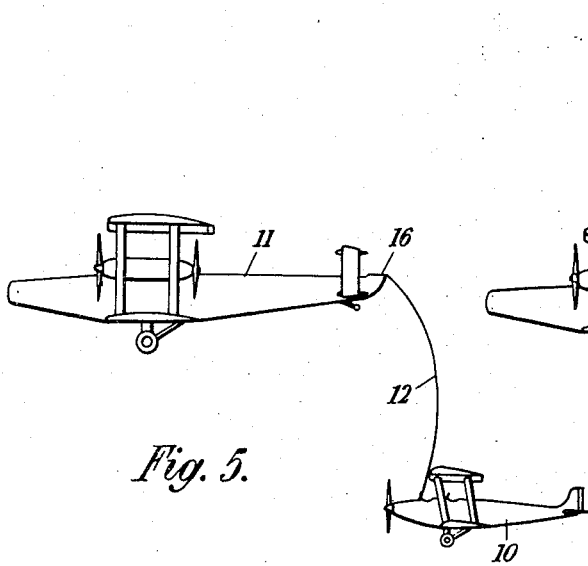
Figure 6:
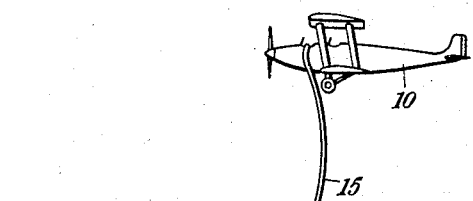

Figs. 5 and 6 are views similar to Fig. 4 but showing a different refueling method.

From Fig. 3 it will be appreciated that should it for any reason become necessary for the operator in the lower machine suddenly to release both the fuel pipe 15, the cord 12 and balloon 13, owing to the fact that the lower machine is not in proper relationship to the upper machine, he will be able to disengage the cord from the guide 14, so that the cord and fuel pipe will trail beneath the upper machine without fouling any part of the lower machine. The tail plane of the lower machine may, if necessary, be guarded by a deflector rod or cable (not shown) so as to cause the pipe or cable to slide to the rear of the lower machine without becoming entangled with the empennage.

The other method is shown in Figs. 5 and 6. In this case, fuel is to be transferred to an air liner 11 from a tanker 10 without interfering with the journey of the air liner. The cord 12, weighted as before with a gas-filled balloon (not shown) weighted with a small quantity of a granular solid is trailed from a cockpit 16 at the tail end of the air liner. Fig. 5 shows the state of affairs immediately after the cord has been picked up by the tanker 10. The tanker then manoeuvres into the position shown in Fig. 6, whereupon the crew of the air liner draw the pipe line 15 across from the tanker to the air liner by pulling on the cord 12. As will be seen in Fig. 6, the pipe line 15 extends from the nose of the tanker 10 to the cockpit 16 in the tail of the air liner 11, where the fuel is transferred to a pipe leading to the fuel tanks of the air liner.

I find that the use of a balloon weighted with a granular solid for establishing contact between the two aircraft has substantial advantages over the use of a liquid-filled balloon for this purpose. It is necessary to carry a number of balloons aboard the aircraft, in case one or more attempts to establish contact should fail, and balloons weighted with a granular solid are easier to handle and store than liquid-filled balloons. There is no danger of leakage and the balloons weighted with the granular solid will keep for months without deterioration.

Experiment has shown that a balloon weighted with a granular solid will inflict no damage at all if it should strike a metal propeller, and even with a wooden propeller no damage at all results except occasionally, when the balloon strikes the extreme blade tip of the rotating propeller. Any possibility of damage to a wooden propeller can, however, be altogether obviated by sheathing the tips of the blades with metal.

What I claim as my invention and desire to secure by Letters Patent is:—

1. Means for establishing communication between two aircraft for the purpose of effecting a transfer of fuel from one to the other in the air, comprising in combination with one of the aircraft a balloon weighted by a quantity of a granular solid and a flexible suspension interconnecting the balloon and the aircraft so that the balloon is trailed beneath the aircraft in position to be picked up by the other aircraft.

2. Means for establishing communication between two aircraft for the purpose of effecting a transfer of fuel from one to the other in the air, comprising in combination with one of the aircraft a balloon weighted by a quantity of a granular solid and containing in addition a light solid inflating material for the purpose of keeping it in shape, and a flexible suspension interconnecting the balloon and the aircraft so that the balloon is trailed beneath the aircraft in position to be picked up by the other aircraft.

ALAN JOHN COBHAM.